Nov. 6, 1934.  T. B. STEPHENSON  1,979,776
ILLUMINATED ADVERTISING, DISPLAY, AND DEMONSTRATING SIGN
Filed Nov. 3, 1933  5 Sheets-Sheet 1
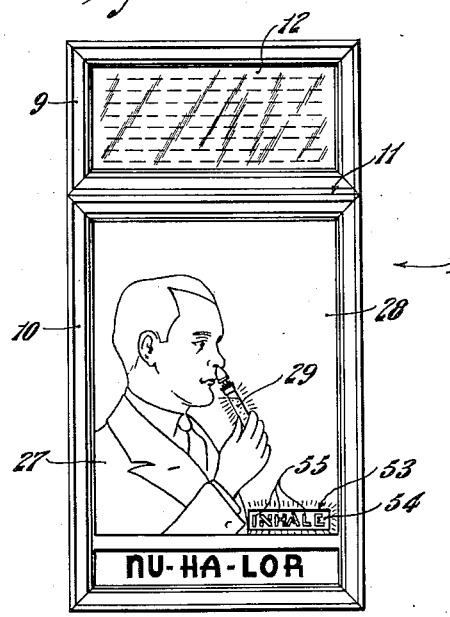
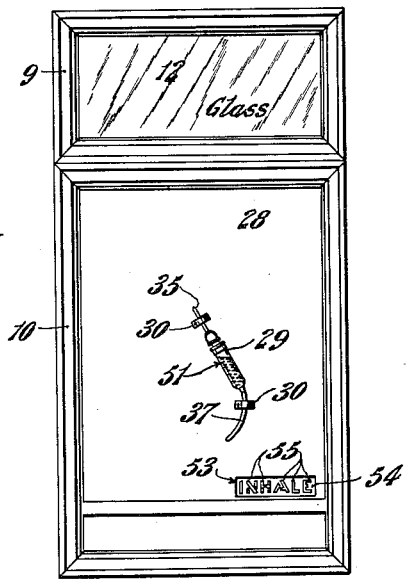
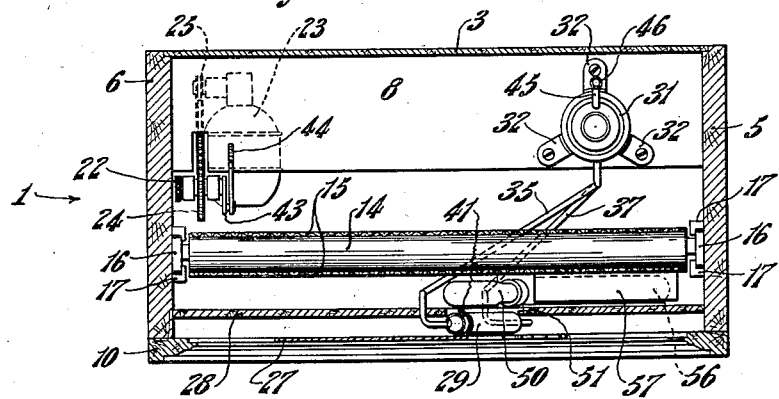
INVENTOR,
Thomas B. Stephenson,
BY
Harry W. Bowen
ATTORNEY.

Nov. 6, 1934.  T. B. STEPHENSON  1,979,776
ILLUMINATED ADVERTISING, DISPLAY, AND DEMONSTRATING SIGN
Filed Nov. 3, 1933  5 Sheets-Sheet 2

Fig. 4.

INVENTOR,
Thomas B. Stephenson,
BY
Harry W. Bowen
ATTORNEY.

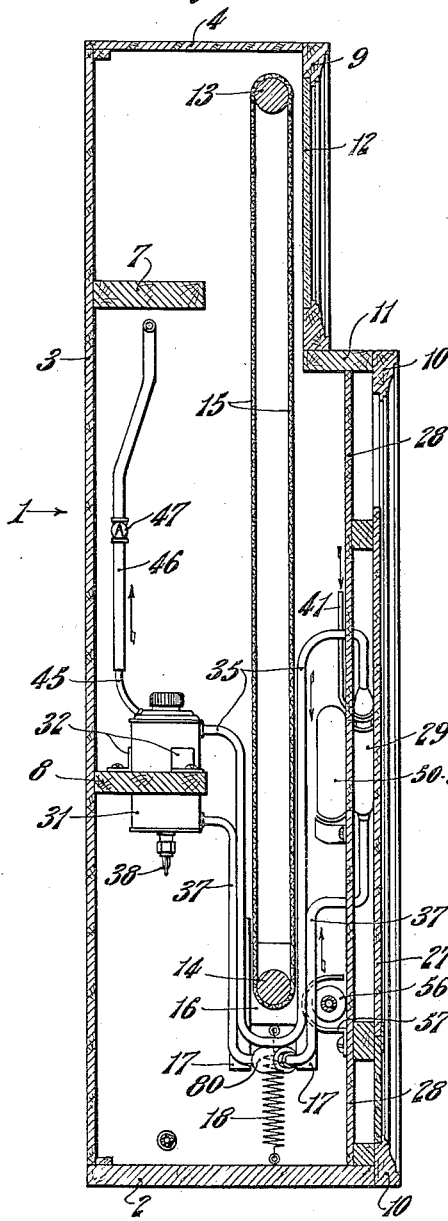

Nov. 6, 1934.                T. B. STEPHENSON                 1,979,776
             ILLUMINATED ADVERTISING, DISPLAY, AND DEMONSTRATING SIGN
                           Filed Nov. 3, 1933          5 Sheets-Sheet 4
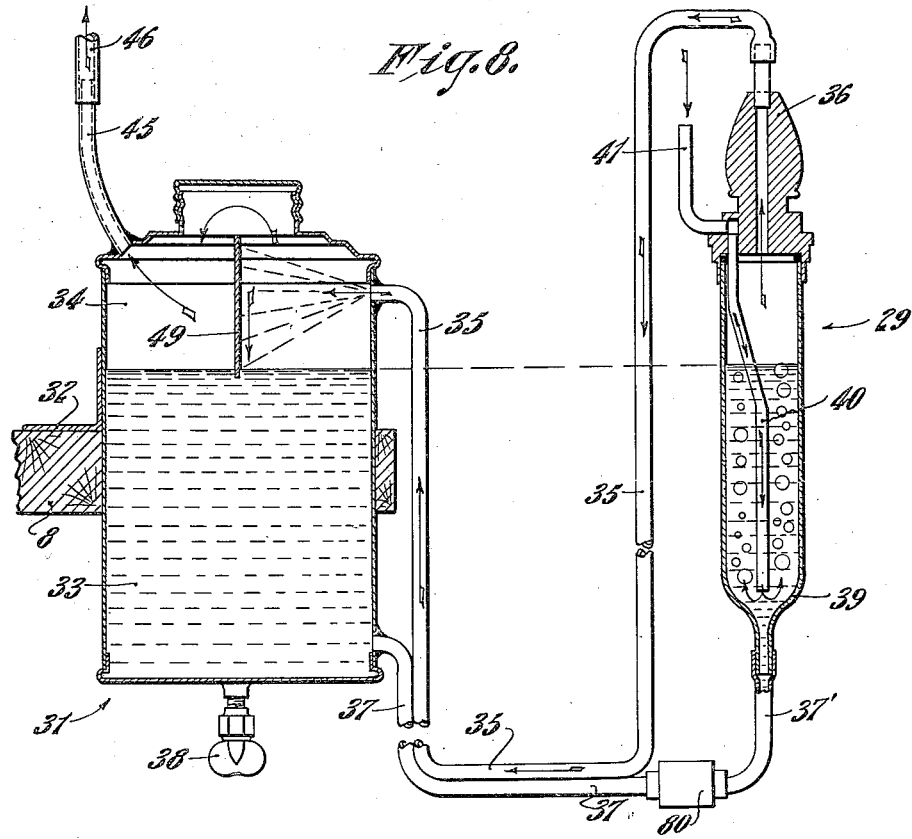
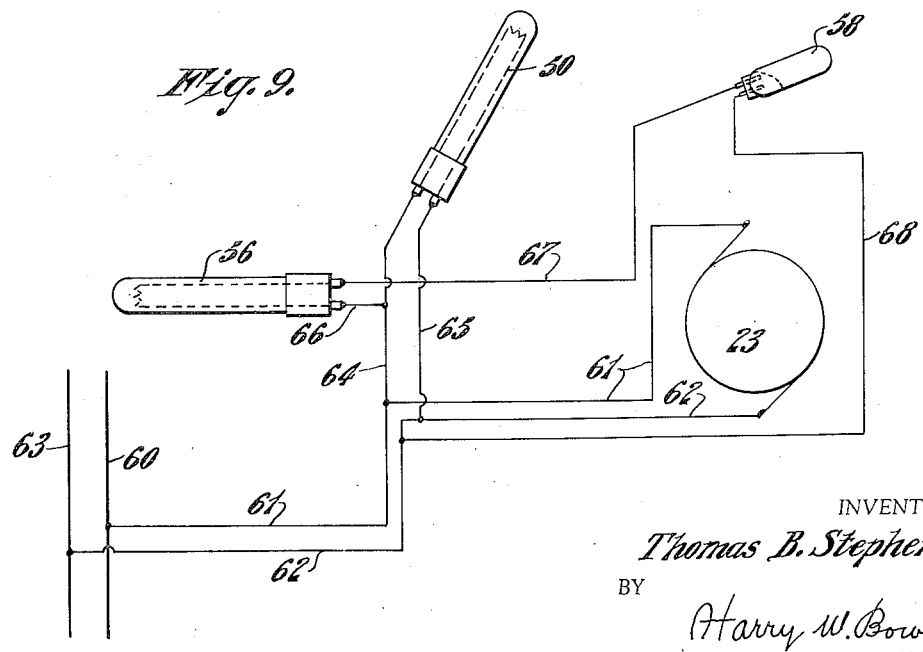
INVENTOR,
Thomas B. Stephenson,
BY
Harry W. Bowen.
ATTORNEY.

Nov. 6, 1934.  T. B. STEPHENSON  1,979,776
ILLUMINATED ADVERTISING, DISPLAY, AND DEMONSTRATING SIGN
Filed Nov. 3, 1933  5 Sheets-Sheet 5
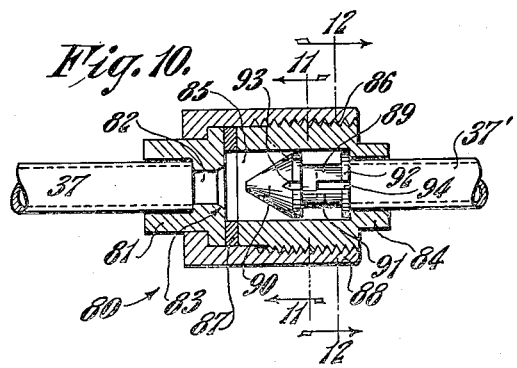
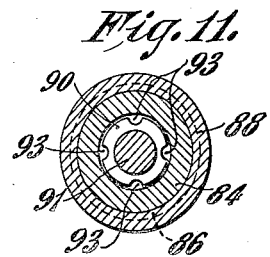
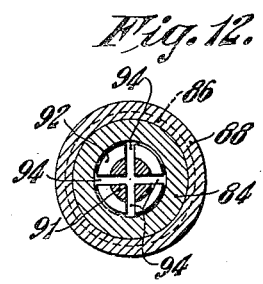
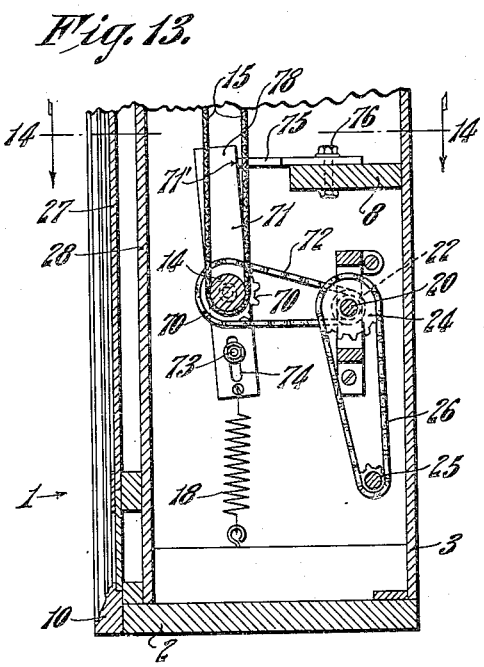
INVENTOR,
Thomas B. Stephenson,
BY
Harry W. Bowen
ATTORNEY.

Patented Nov. 6, 1934

1,979,776

UNITED STATES PATENT OFFICE 1,979,776

ILLUMINATED ADVERTISING, DISPLAY, AND DEMONSTRATING SIGN

Thomas B. Stephenson, Springfield, Mass.

Application November 3, 1933, Serial No. 696,525

14 Claims. (Cl. 40—126)

My invention relates to improvements in illuminated advertising, display, and demonstrating signs, and more particularly to a sign of that class having incorporated therein some form of movement for the purpose of attracting the attention of a prospective purchaser.

An object of my invention is to provide, in an illuminated sign, means for presenting, in an attractive setting, the actual article advertised in such a manner as to indicate the use to which the article is adapted.

A further object of my invention is to provide, in such a sign, mechanical means for duplicating the operation of the advertised article in ordinary use, thereby instructing a prospective purchaser, who views the sign, in the proper use of the article advertised therein.

These, and other objects and advantages of my invention will be more completely described and disclosed in the specification, the accompanying drawings, and the appended claims.

Broadly, my invention comprises a casing member, an endless belt, or screen, having advertising matter printed thereon that is rotatably supported in the casing member, an article to be advertised secured in the front of the casing member, in co-operation with a figure illustrating its use, means for intermittently operating the article, in such a manner, as to duplicate its operation, in ordinary use, means co-operating with the operating means for intermittently illuminating an instructive sign, when the article is operated, and means for illuminating the article displayed.

A preferred embodiment of my invention is illustrated in the accompanying drawings, in which:

Fig. 1 is a front, elevational view of the cabinet.

Fig. 2 is a view similar to Fig. 1, with the figure removed to show the arrangement of the atomizer on its supporting partition.

Fig. 3 is a plan, sectional view on the line 3—3 of Fig. 4.

Fig. 4 is a rear, elevational view of the cabinet with the back plate member removed.

Fig. 5 is a cross sectional view on the line 5—5 of Fig. 4.

Fig. 6 is a partial, cross sectional view on the line 6—6 of Fig. 4.

Fig. 7 is a partial, cross sectional view on the line 7—7 of Fig. 4.

Fig. 8 is a detail view, partially in section, of the atomizer and oil reservoir.

Fig. 9 is a wiring diagram, illustrating the circuits to the illuminating lamps and the motor.

Fig. 10 is a longitudinal, sectional view of the check valve in the tube, which supplies liquid from the reservoir to the atomizer.

Fig. 11 is a cross sectional view on the line 11—11 of Fig. 10.

Fig. 12 is a cross sectional view on the line 12—12 of Fig. 10.

Fig. 13 is a view similar to Fig. 6, illustrating a modified, or preferred drive and bearing, for the lower roll which supports the endless belt, and Fig. 14 is a partial, plan, sectional view on the line 14—14 of Fig. 13.

Referring now to the drawings in detail, in which like numerals refer to like parts throughout:—

The cabinet 1, having the base 2, back 3, top 4, sides 5 and 6, and shelves 7 and 8, is open at the front and has secured to the front edges of the base 2, sides 5 and 6, and top 4, the frame members 9 and 10, which are separated by the shelf portion 11. The frame member 9 has secured therein the transparent plate 12, of glass, or other suitable material. Rollers 13 and 14 support the endless curtain 15, upon which may be printed advertising matter, in connection with the article displayed. A portion of the curtain 15 is always visible, from the outside of the cabinet 1, through the transparent plate 12, as indicated in Figs. 1 and 5. The lower roller 14 is rotatably secured in the bearing blocks 16, which are slidably secured in the ways 17, as clearly shown in Fig. 3. The belt 15 is kept taut by means of the contractile springs 18 secured to the blocks 16 and to the base 2 of the cabinet 1. The upper roller 13 is rotatably secured in the sides 5 and 6 of the cabinet 1, and has secured thereto the sprocket 19, (see Fig. 4). The sprocket 19 is operatively connected to the counter shaft 20 by a chain 21 and sprocket 22. The shaft 20 is operatively connected to a motor 23 by sprockets 24 and 25 and chain 26. Thus, the endless-belt 15 is revolved, or moved, about the rollers 13 and 14, by frictional contact therewith; one of the rollers, namely, the upper one, 13, is revolved by the motor 23, through sprockets 24 and 25, chain 26, shaft 20 and sprockets 19 and 22, and chain 21.

In the modified drive construction, shown in Figs. 13 and 14, for the belt 15, the lower roller 14 has secured thereto the sprocket 70, and both are rotatably supported in the bearing member 71. The sprocket 70 is driven from the shaft 20 by the chain 72 and sprocket 22. The bearing member 71 is pivotally secured at 73 to the side 5 of the cabinet 1, and is formed with the slot 74 which provides for vertical movement of the member 71 and roller 14, induced by the contractile spring 18 to maintain tension on the belt 15. An adjusting block 75, slidably secured on the shelf 8 by means of the bolt, or screw 76, located in the slot 77, formed in the block 75, impinges against the upper portion 78 of the member 71 at 71'. Thus, any slack in the chain 72 may be taken up by adjustment of the block 75, which will move the member 71 away from the shaft 20, pivoting on the bolt, or screw 73.

A figure 27, of cardboard, wood, or other suitable material, is secured in the front frame 10, as indicated in Fig. 1. A partition, 28, is secured in the cabinet 1 and spaced rearwardly from the figure 27. Supports are provided thereon, for the article to be advertised. In the embodiment of my invention, illustrated in the drawings, an atomizer 29 is secured to the partition 28, by clips 30, and the figure 27 is a representation of an imaginary person's head and hand, in proper co-operative relation, to indicate the use of the atomizer 29, as indicated in Fig. 1.

A receptacle, or reservoir 31, containing the liquid to be inhaled, is secured on the shelf 8, by means of clips 32, at approximately the same level, as the atomizer 29. The reservoir 31 contains a liquid 33, which occupies approximately two-thirds of the capacity of the reservoir 31, leaving an air chamber 34 in the top of the reservoir 31, as shown in Fig. 8. A tube 35 connects the top 36 of the atomizer 29 and the air chamber 34 of the reservoir 31. A second tube 37, connecting the bottom 39 of the atomizer 29 and the bottom of the reservoir 31, provides a passage through which the liquid 33 passes from the reservoir 31 into the atomizer 29. The level of the liquid, in the reservoir 31, is adjusted to bring the level in the atomizer to the desired height, by means of the draw-off 38, in the bottom of the reservoir 31. A tube 40, within the atomizer 29 and connected to the inlet pipe 41, provides a passage, by means of which air may enter the atomizer 29, near the bottom 39 thereof. A bellows 42, secured on the shelf 7, is operatively connected to a crank 43, on the shaft 20 by link 44. (See Fig. 4.) An inlet pipe 45, connected to the air chamber 34, is connected to the bellows 42 by a tube 46. A check valve 47, in the tube 46, permits air to flow from the air chamber 34, into the bellows 42, and prevents air from flowing from the bellows 42, into the air chamber 34. A second check valve 48, on the bellows 42, permits air to be expelled from the bellows 42 and seals the bellows 42 against entering air, except through the tube 46.

In operation, the bellows 42 is operated by the motor 23, by means of the sprockets 24 and 25, chain 26, shaft 20, crank 43, and link 44. When the bellows is contracted, air is forced out of the bellows through valve 48. When the bellows is expanded, air is drawn into the bellows from the air chamber 34, through the tube 46. Thus, a vacuum formed in the chamber 34, which induces air to enter the intake pipe 41, on the atomizer 29, thence through the pipe 40, into the bottom of the atomizer 29. This air is then drawn up through the liquid in the atomizer and through the pipe, or tube 35, into the air chamber 34, in the reservoir 31. As the air bubbles pass upward through the liquid in the atomizer, a certain amount of the liquid is taken up and carried into the reservoir 31. A baffle 49, interposed between the entrance of the pipe 35 and the pipe 45, prevents the liquid, in the form of mist, from entering the tube 46 and bellows 42, as indicated in Fig. 8.

To prevent the vacuum formed in the chamber 34, by action of the bellows 42, from drawing the liquid from the atomizer 29 into the reservoir 31, I insert a check valve 80 in the tube 37 leading from the bottom of the reservoir 31 to the bottom of the atomizer 29. The construction of this check valve 80 is illustrated in Figs. 10, 11, and 12. The tube 37, leading from the reservoir 31, is secured by solder, or other suitable means, to the terminal member 81, which is formed with the opening 82 and tapered seat 83. The tube 37', leading from the valve 80 to the bottom of the atomizer 29, is secured in a similar manner to the terminal member 84, which is formed with the opening 85 and threads 86. The members 81 and 84 are secured together with the packing washer 87, between their adjacent faces, by the threaded coupling member 88. A float 89 is slidably supported in the opening 85 of the member 84. The float 89 is formed with the conical nose portion 90, the neck portion 91, and the flange 92. Notches 93, formed in the nose portion 90, and slots 94, formed in the flange 92 and neck 91, permit the liquid to flow into the tube 37' from the tube 37, when the valve is open, as shown in Fig. 10. When a vacuum is formed in the chamber 34, of the receptacle 31, the conical nose portion 90 of the float 89 is seated on the tapered seat 83, thus closing the tube 37 and preventing the liquid from flowing from the tube 37' into the tube 37, from the atomizer 29, back into the receptacle 31, when the vacuum is produced in this receptacle. The flange 92, against which the liquid in the pipe 37', engages, materially assists in moving the tapered end 90 to its seat, indicated at 83.

The atomizer 29 is illuminated by the lamp 50, which is secured, in any suitable manner, to the back of the partition 28. An opening 51, formed in the partition 28, is arranged, in such a manner, as to permit light from the lamp 50, to shine through the opening 51 and onto the atomizer 29. This opening is smaller in width than the diameter of the atomizer. Thus, the atomizer, and the action of the air bubbles in passing through the liquid in the atomizer, are brilliantly illuminated, in comparison to the relatively dark and unlighted partition 28, and figure 27.

An instructive sign and means for intermittently illuminating the sign in synchronism with the movement of air bubbles through the atomizer 29, are incorporated in the cabinet 1. An opening 53 is formed in the partition 28, and a stencil 54 is secured on the back of the partition, in such a manner, as to expose the letters 55 of the stencil, through the opening 53. A painted, or printed plate, of translucent material, such as glass, celluloid, or the like, may be substituted for the stencil illustrated in the drawings. An electric lamp 50 is secured in the shield and reflector 57, which is secured to the partition 28, in any suitable manner. A mercury switch 58, attached to the bellows 42 by means of the bracket 59, opens and closes the electric circuit to the lamp 56, as the bellows 42 is operated. When the bellows is contracted, the switch operates to close the circuit, which remains closed, until the bellows is expanded, at which time the circuit is opened, until the bellows is contracted again. The result of this action is to illuminate the letters 55 in the stencil 54, while the air bubbles are being drawn through the atomizer 29, by the action of the bellows 42. The electric circuits are diagrammatically illustrated in Fig. 9. The circuit for the motor 23 is from line 60 to wire 61; motor 23; wire 62 to line 63. The circuit to the atomizer illuminating lamp 50 is from line 60, to wire 61; wire 64; lamp 50; wire 65; wire 62 to line 63. The circuit to the sign illuminating lamp 56 is from line 60 to wire 61; wire 64; wire 66; lamp 56; wire 67; switch 58; wire 68; wire 62, to line 63.

It will be understood that, as the roller 13 or 14 and bellows 42 are both operatively connected to the shaft 20, the endless belt 15 may be arranged on the rollers 13 and 14, in such a manner as to time the appearance back of the glass plate 12, of the reading on the curtain 15, in any desired relation to the operation of the bellows 42 and lamp 56.

It should be stated that the flow of bubbles of air, through the liquid in the atomizer 29, shown in Fig. 8, illustrates the exact operation of the atomizer, when a person applies the end 36 to the nostrils and inhales the air that carries the liquid up into the nostrils. In other words, the apparatus visually demonstrates the operation of the inhaler, when viewed from the outside of the cabinet.

The atomizer 29 is taken from manufacturers' stock of such articles, and adapted for use in this device, or sign, by forming on the normally closed end 39 a projecting neck provided with an opening, to which the tube 37' may be secured. The atomizer, as used by a person, is first filled with a liquid by removing the cap 36. After filling the atomizer, the cap 36 is replaced. The nostril of a person, using the atomizer, is substituted for the tube 35; air is drawn into the atomizer through the tube 40, and the liquid is drawn from the atomizer into the nasal passages through the cap 36, as illustrated in Fig. 1.

What I claim is:—

1. In combination, in a display apparatus for demonstrating the use of a nasal preparation, an enclosing casing, a receptacle for receiving the nasal liquid, an atomizer member, communicating means between the said receptacle and the atomizer member, means for producing a vacuum in the said receptacle for drawing air into the atomizer and through the liquid, the atomizer having means for admitting air therein and liquid from the receptacle, and means for illuminating the atomizer member.

2. In combination, in a display apparatus for demonstating the use of a nasal preparation, an enclosing casing, a receptacle for receiving the nasal liquid, an atomizer member, communicating means between the said receptacle and the atomizer member, means for producing a vacuum in the said receptacle and the atomizer, the atomizer having means for admitting air therein and liquid from the receptacle, means for illuminating the atomizer member, means for simultaneously displaying and illuminating a sign device when the atomizer is operated, and operative connecting means between the vacuum-producing means and the means for illuminating the atomizer and the sign.

3. In an apparatus for the purpose described, a casing, a window in the casing, a pair of rollers supported on the casing, an endless belt on the rollers, carrying descriptive matter thereon, means for continuously operating the belt to pass the said belt by said window, a member in the casing showing the head of a person, a partition member adjacent the head-showing member having an opening adjacent the head part, an electric bulb back of the opening, an atomizer member on the other side of the said opening in the partition and adjacent the head part, means for operating the atomizer, a motor, and operative connecting means between the motor, the belt-operating means, and the means for operating the atomizer, use of the atomizer relative to the head of a person being simultaneously demonstrated, as described.

4. In an apparatus for the purpose described, a casing, a member in the casing showing the head of a person, a partition member adjacent the head showing member having an opening adjacent the head part, an electric bulb back of the opening, an atomizer member on the other side of the said opening in the partition and adjacent the head part, means for operating the atomizer including a bellows member connected thereto, whereby the use of the atomizer relative to the head of a person is displayed, as described, a sign, an electric bulb back of the sign, and means actuated by the said bellows for opening and closing the circuit to the bulb back of the sign when the atomizer is operated.

5. In an apparatus for the purpose described, a casing, a pair of rollers supported therein, an endless belt bearing descriptive matter on the rollers, a member in the casing showing a fanciful head of a person, a partition member adjacent the said head showing member having an opening adjacent the head part, an electric bulb back of the opening, an atomizer member on the other side of the said opening in the partition and adjacent the head part, means for operating the atomizer and the belt simultaneously, whereby the use of the atomizer relative to the head of a person is displayed, as described.

6. In an apparatus for displaying the operation of an atomizer for nasal use comprising, in combination, a casing, a receptacle therein for containing the liquid to be atomized, an atomizer device having an air and liquid inlet secured to the casing, means for equalizing the level of the liquid in both the receptacle and atomizer to provide an air space in each, means for producing a vacuum effect simultaneously in said receptacle and atomizer, whereby air is drawn into and through the atomizer and air laden with the liquid is carried into the spaces in the receptacle and atomizer respectively.

7. In an apparatus for displaying the operation of an atomizer for nasal use comprising, in combination, a casing, a receptacle therein for containing the liquid to be atomized, an atomizer device having an air and liquid inlet secured to the casing, means for equalizing the level of the liquid in both the receptacle and atomizer to provide an air space in each, means for producing a vacuum effect simultaneously in said receptacle and atomizer, whereby air is drawn into and through the atomizer and air laden with the liquid is carried into the spaces in the atomizer and receptacle respectively, an electric bulb for illuminating the atomizer, a circuit therefor, a sign, a second electric bulb for illuminating the sign, a circuit therefor, and means operatively connected to the vacuum producing means for closing the lamp circuit to said second electric bulb when the atomizer is operated.

8. In an apparatus for displaying the operation of an atomizer for nasal use comprising, in combination, a casing, a receptacle therein for containing the liquid to be atomized, an atomizer device having an air and liquid inlet secured to the casing, means for equalizing the level of the liquid in both the receptacle and atomizer to provide an air space in each, means for producing a vacuum effect simultaneously in said receptacle and atomizer, whereby air is drawn into and through the atomizer and air laden with the liquid is carried into the spaces in the atomizer and receptacle respectively, an electric bulb for illuminating the atomizer, a circuit therefor, a second electric bulb, a circuit therefor, a stencil plate adjacent the second bulb and located opposite an opening in the casing, means operatively connected to the vacuum producing means for closing the lamp circuit to the second bulb when the atomizer is operated, whereby the atomizer is operated and the stencil illuminated at the same time.

9. In combination, in a display device for illustrating the use of an atomizer for the treatment of nasal affections comprising, an enclosing casing, a movable screen therein for displaying reading matter thereon, rollers for supporting the screen, means for pivotally mounting one of the rollers for taking up any slack in the driving means of the said roller, an electric bulb, a partition in the casing having an opening opposite the bulb, an atomizer member on the opposite side of the partition and adjacent the opening, and means for operating the screen and actuating the liquid in the atomizer.

10. In combination, in a display and demonstrating device for illustrating the use of an atomizer for the treatment of nasal affections comprising, an enclosing casing, a movable belt therein for displaying reading matter thereon, a partition in the casing formed with an opening therein, an atomizer member on the front of said partition and adjacent said opening for receiving a liquid in said atomizer, an electric bulb adjacent said partition and said opening, an electric circuit for said bulb, an instructive sign on said partition, a second electric bulb for illuminating said sign, a second electric circuit for said second electric bulb, a switch in said second circuit, means for actuating the liquid in the atomizer, operating said switch, and moving said belt in synchronism, said means comprising a bellows for producing a vacuum effect in said atomizer, a motor, a drive shaft operatively connected to said motor, operative connective means between the bellows, the belt, and the drive shaft, and operative connecting means between the bellows and the switch, substantially, as described.

11. In an atomizer display device, a casing, an atomizer member therein, means for supplying the atomizer liquid thereto, means for providing a vacuum effect in the liquid supply means and in the atomizer, an instructive sign, means for illuminating the sign when the vacuum effect is produced and for agitating the contents of the atomizer, means for illuminating the atomizer, the atomizer being located adjacent the nostrils of a figure that is shown on a part adjacent the atomizer and the illuminating means, and means for intermittently actuating the vacuum producing means and the illuminating means for the sign at the same time.

12. In an atomizer display device, a casing, an atomizer member therein, means for supplying the atomizer liquid thereto, means for providing a vacuum effect in the liquid supply means and in the atomizer, a sign, means for illuminating the sign when the vacuum effect is produced for agitating the contents of the atomizer, the atomizer being located adjacent the nostrils of a figure that is shown on a part adjacent the atomizer and the illuminating means, and means for intermittently actuating the vacuum producing means and the illuminating means at the same time.

13. In combination, in a display device for illustrating the use of an atomizer for treating nasal affections, an enclosing casing, a receptacle for receiving the atomizing solution, an atomizer, pipe means connecting the receptacle and atomizer at the upper and lower portions respectively, of the same, means in the bottom pipe means for permitting the liquid to flow only in one direction, and means for producing a vacuum effect in the receptacle and atomizer.

14. In a device for the purpose described, an enclosing casing, a belt therein for displaying advertising matter, upper and lower rollers for movably supporting the belt, means for pivotally and adjustably supporting the lower roller, a driving chain for the lower roller, means engaging the said roller-supporting means for adjusting the tension of the driving chain, and means for driving the driving chain.

THOMAS B. STEPHENSON.